(12) United States Patent
Iftime et al.

(10) Patent No.: US 7,762,473 B2
(45) Date of Patent: Jul. 27, 2010

(54) MACHINE-READABLE CODE FORMAT

(75) Inventors: Gabriel Iftime, Mississauga (CA); Peter M. Kazmaier, Mississauga (CA); Paul F. Smith, Oakville (CA); Christopher A. Wagner, Etobicoke (CA); Hadi K. Mahabadi, Mississauga (CA); Tyler B. Norsten, Oakville (CA)

(73) Assignee: Xerox Corporation, Norwalk, CT (US)

( * ) Notice: Subject to any disclaimer, the term of this patent is extended or adjusted under 35 U.S.C. 154(b) by 911 days.

(21) Appl. No.: 11/564,054

(22) Filed: Nov. 28, 2006

(65) Prior Publication Data

US 2008/0121727 A1 May 29, 2008

(51) Int. Cl.
*G06K 19/06* (2006.01)
*G06K 7/10* (2006.01)

(52) U.S. Cl. .................................. 235/494; 235/462.01
(58) Field of Classification Search ..................
235/462.01–462.45, 472.01, 472.02, 472.03,
235/454, 455, 494
See application file for complete search history.

(56) References Cited

U.S. PATENT DOCUMENTS

| 5,122,187 | A | | 6/1992 | Schwarz et al. | |
|---|---|---|---|---|---|
| 5,128,525 | A | | 7/1992 | Stearns et al. | |
| 5,168,147 | A | | 12/1992 | Bloomberg | |
| 5,608,200 | A | * | 3/1997 | Le Goff et al. | 235/462.02 |
| 5,798,513 | A | * | 8/1998 | Ackley | 235/462.16 |
| 6,708,884 | B1 | * | 3/2004 | Su et al. | 235/462.09 |
| 6,905,755 | B1 | | 6/2005 | Nemeth | |
| 6,906,118 | B2 | | 6/2005 | Goodbrand et al. | |
| 7,044,386 | B2 | | 5/2006 | Berson | |
| 2004/0035936 | A1 | * | 2/2004 | Hoson et al. | 235/462.16 |
| 2005/0018874 | A1 | | 1/2005 | Rhoads | |
| 2005/0253052 | A1 | * | 11/2005 | Martenson et al. | 250/231.13 |
| 2005/0269416 | A1 | * | 12/2005 | Sussmeier et al. | 235/494 |
| 2006/0113390 | A1 | * | 6/2006 | Muramatsu | 235/462.27 |
| 2006/0163363 | A1 | | 7/2006 | Berson | |
| 2007/0278313 | A1 | * | 12/2007 | Jones et al. | 235/487 |
| 2009/0026276 | A1 | * | 1/2009 | Yulevitch | 235/494 |
| 2010/0012736 | A1 | * | 1/2010 | Wilds et al. | 235/494 |

OTHER PUBLICATIONS

U.S. Appl. No. 11/548,775, filed Oct. 12, 2006.
U.S. Appl. No. 11/548,774, filed Oct. 12, 2006.

* cited by examiner

*Primary Examiner*—Thien M Le
(74) *Attorney, Agent, or Firm*—Oliff & Berridge, PLC

(57) ABSTRACT

Disclosed is a machine readable cord of a set of printed markings, wherein each printed marking of the set has a predetermined height on a substrate and represents a predetermined date value, wherein printed markings having a same predetermined height represent a same data value, and wherein printed markings representing different data values have different heights. Also disclosed is a system for embedding and recovering information on a substrate, including an image forming device containing at least one marking material, wherein the image forming device receives data, corresponding to the information, for forming machine readable code in accordance with claim 1 on an image receiving substrate, and forms an image including the machine readable code on the image receiving substrate with the at least one marking material, and a document reading device comprising a reader that detects the differences in height among the different printed markings of the machine readable code.

16 Claims, 1 Drawing Sheet

MACHINE-READABLE CODE FORMAT

BACKGROUND

Described herein is a process and code system for embedding information on an object such as paper, cardboard, plastic and the like. The process and code system are based on the use of printed markings formed to have different heights, which difference in heights can be detected by a reading device. The printed markings of different heights represent different data values, thereby allowing information to be encoded and embedded in a printed image or document. The process and code thus permit information to be covertly embedded in a document or image, and does not allow for the information to be readily duplicated by present office equipment such as copies and scanners.

U.S. Pat. No. 6,905,755 describes a security document or other device including a substrate (2), a smooth highly reflective layer (1) applied thereto and having a reflectivity of at least 60 gloss units, and a raised printed image (3) applied to said reflective layer by a printing process such as the gravure process, the raised printed image having a height of at least 10 microns and being printed using a translucent ink having a large value of 85 to 95 as measured on an XL 211 Hazegard haze measuring instrument, which render it substantially transparent or translucent while causing scattering of the light reflectance and transmittance in at least a partially specular manner. See the Abstract. The printed image is only viewable at specific angles.

U.S. Pat. No. 7,044,386 describes a method for applying surface modifications in at least two patterns that differ in spectral emissivity by known amounts. The patterns form an information-encoding sequence of transitions of differential emissivity along a scan path over the patterns, that encodes a set of information. This information is decoded by a scanner sensitive to emissivity in the given portion of the electromagnetic spectrum, and sensitive to transitions in emissivity of the known amounts, when scanned along the scan path, combined with knowledge of the expected emissivity values of the patterns. This provides secure informational marking of articles and documents, including mail. The patterns may be visible, or hidden, but the emissivity values are not duplicated by standard office equipment, so authenticity of the patterns can be determined using the special emissivity scanner. FIG. 2 is a sectional view of part of a surface with areas of varying spectral emissivity created by varying surface texture or roughness, for example by embossing.

U.S. Patent Publication No. 2005/0018874 describes security documents (e.g. passports, currency, event tickets, and the like) are encoded to convey machine-readable multi-bit binary information (e.g., a digital watermark), usually in a manner not alerting human viewers that such information is present. The documents can be provided with overt or subliminal calibration patterns. When a document incorporating such a pattern is scanned (e.g. by a photocopier), the pattern facilitates detection of the encoded information notwithstanding possible scaling or rotation of the scan data. The calibration pattern can serve as a carrier for the watermark information, or the watermark can be encoded independently. In one embodiment, the watermark and the calibration pattern are formed on the document by an intaglio process, with or without ink. A photocopier responsive to such markings can take predetermined action if reproduction of a security document is attempted. A passport processing station responsive to such markings can use the decoded binary data to access a database having information concerning the passport holder. Some such apparatuses detect both the watermark data and the presence of a visible structure characteristic of a security document (e.g., a printed seal of the document's issuer).

It is estimated that worldwide counterfeiting and piracy cost brand owners over $500 billion every year. As a result, document and product security is of key importance for companies to protect their products and brand against counterfeiting. With the proliferation of digital printing, there is a need to protect printed documents, and document security needs to keep step.

Previously, Xerox has developed the concept of glyphs, wherein the information is digitalized onto paper by transforming it into rods of two different orientations. Glyphs printed with single black toner, however, may be easily photocopied, subjecting the encrypted information to being replicated or recovered by forgers. There is a need for a technology which does not allow the encrypted information to be photocopied.

There is thus a constant need for new technologies, systems and processes for embedding and recovering information on an object for security and/or verification,/authentication applications. Further, there is a need for systems and processes that enable the placement of encoded information on documents, overtly or covertly, that is machine readable and not easily reproduced by office equipment such as copiers and scanners.

SUMMARY

These and other objects may be achieved herein by providing machine readable code comprising a set of printed markings, wherein each printed marking of the set has a predetermined height on a substrate and represents a predetermined data value, wherein printed markings having a same predetermined height represent a same data value, and wherein printed markings representing different data values have different heights.

Also provided is a substrate having machine readable code thereon, wherein the code comprises a set of printed markings, wherein each printed marking of the set has a predetermined height on a substrate and represents a predetermined data value, wherein printed markings having a same predetermined height represent a same data value, and wherein printed markings representing different data values have different heights.

Also provided is a system for embedding and recovering information on a substrate, comprising an image forming device containing at least one marking material, wherein the image forming device receives data, corresponding to the information, for forming the machine readable code as indicated above on an image receiving substrate, and forms an image including the machine readable code on the image receiving substrate with the at least one marking material; and a document reading device comprising a reader that detects the differences in height among the different printed markings of the machine readable code.

In further embodiments, also provided is a method of embedding information on a substrate, comprising converting the information to machine readable code, wherein the code comprises a set of intended printed markings, wherein each intended printed marking of the set has a predetermined height on a substrate and represents a predetermined data value, wherein intended printed markings having a same predetermined height represent a same data value, and wherein intended printed markings representing different data values have different heights; and writing the machine readable code on the substrate such that each of the intended printed markings is formed as a printed marking with the predetermined height.

EMBODIMENTS

Figure 1:
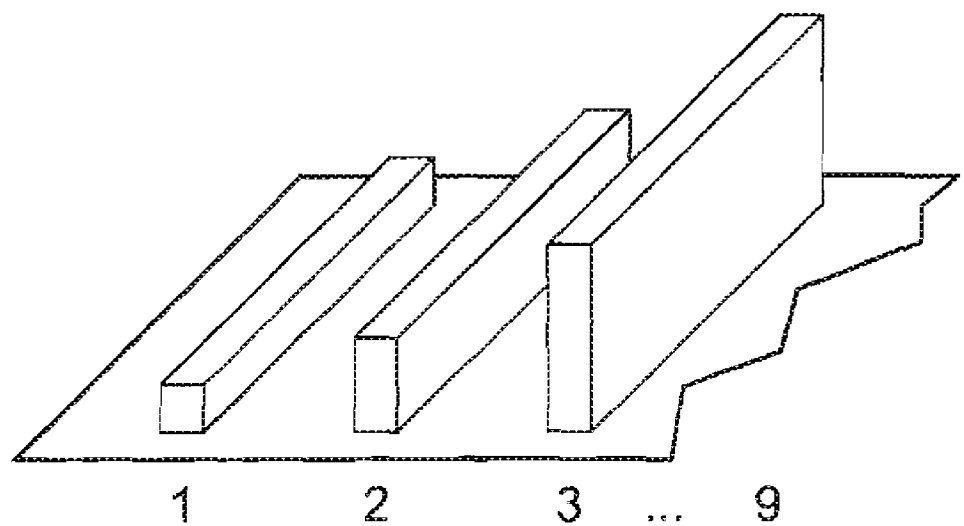
FIG. 1 is an example of machine readable code in bar code form in which printed marks/bars of different heights represent different data values from 0 to 9.

The code format will first be discussed. Any suitable or desired machine readable code format may be selected, including one-dimensional symbologies such as bar codes, two-dimensional symbologies such as stacked bar codes, matrix codes, codes such as PDF417, and the like. The code may be in binary form, for example encoding 0s and 1s, or can be in other forms, for example encoding each value from 0 to 9. The printed markings of the machine readable code set thus may take any suitable form, for example including rods or strips as in barcodes, dots, glyphs, and the like.

The machine readable code thus comprises a set of printed markings, wherein each printed marking of the set has a predetermined print height on a substrate and represents a predetermined data value, wherein the set of printed markings includes printed markings representing different data values and having different print heights.

Thus, encrypted information is printed on a substrate by using variable height marking material such as liquid or solid ink or toner. The different print heights can be recognized and distinguished by a reader, as will be discussed further below, and thus the different print heights can be used to encode different digital data values.

In embodiments, the different predetermined print heights for each of the different printed markings differ from each other by from about 3 μm to about 100 μm, such as from about 3 μm to about 50 μm or from about 3 μm to about 25 μm. Print height refers to, for example, the height of the printed mark as determined from the base of the substrate upon which the printed mark is formed to the top portion of the printed mark where the mark is detected and read by a reading device. The printed heights may also differ by more than 100 μm, but the height differential may become visible to the naked eye or to the touch, and the printed markings of greater heights may become subject to damage during handling as a result of being too tall. On the other hand, print height differentials of 1 μm or less may be too difficult for a reading machine to consistently accurately detect as representing different data values. Thus, in embodiments, the tolerance of a reading device may be set such that printed markings having a printed height that is within +/−1 μm of each other are considered to have a same predetermined height and/or to represent a same data value.

In embodiments, the machine readable code may be written using a set of printed markings having a different height associated with each printed marking and representing different single digit numbers from 0 to 9. For example, the machine readable code may be a barcode, and the set of printed markings includes two to ten printed markings of different predetermined heights. In embodiments, the set of printed markings may include ten different printed markings of different predetermined heights, and wherein each of the ten different printed markings represents one of the data values selected from 0, 1, 2, 3, 4, 5, 6, 7, 8 and 9.

An example of such a printed marking set is partially shown in FIG. 1. In this embodiment, raised barcode is created in such a way that each number from 0 to 9 has an assigned print height as shown in FIG. 1. For example, 0 may be assigned a print height of about 8 μm, 1 a print height of about 16 microns, 3 a print height of about 24 μm, and so on up to 9.

Of course, this assigning of data values of from 0 to 9 may be used with other printed marking forms besides barcodes.

Figure 2:
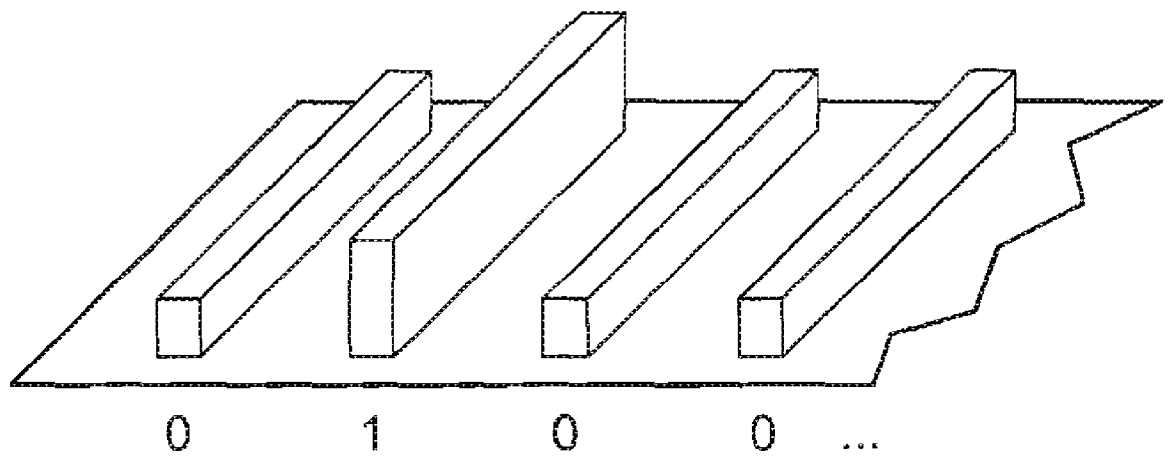
FIG. 2 is an example of machine readable code in binary code form in which printed marks/bars of different heights represent different data values of 0 or 1.

In further embodiments, binary based digital encoding may be created by having 0s and 1s made of printed markings different print heights. An example of such a printed marking set is shown in FIG. 2. In this embodiment, encrypted digital information is created using two different print heights. For example, 0s may be assigned a print height of about 10 μm and 1s assigned a print height of about 20 μm.

In embodiments, the code format may be comprised of a self-clocking glyph code as disclosed in, for example, U.S. Pat. Nos. 5,128,525 and 5,168,147, the disclosures of each of which are totally incorporated herein by reference. In one embodiment, this code comprises printed glyphs which represent 0 and 1 bits in a document encoding scheme. The glyphs are printed at a substantially uniform distance from each other, so that the center of each glyph is a substantially uniform distance from the center of adjacent glyph(s). If printed with colored inks or toners, the visual appearance of the marks, to the naked eye, may appear as a textured grayish area. These marks can be printed at very high densities of, for example, about 3,600 data bits per square inch or higher, and scanned with a 300 pixel per inch scanner. Data is encoded by the shape or the rotational orientation of the mark. Clocking can be taken from the data itself without synchronization marks external to the data. By placing a mark at each data bit position, it is easier to synchronize the reading process of the data without the use of registration marks. The number of bits that can be represented by each symbol is related to the total number of symbols in the code; when the number of bits to be represented by a symbol is "n", the total number of glyphs possible in the code is $2^n$ distinctive glyphs. For example, in a code wherein two distinct glyphs are possible, such as / and \, each symbol may represent one bit; for example, /=1 and \=0. In a code wherein four distinct glyphs are possible, such as /, —, \, and |, each symbol can represent two bits; for example, /=00, |=01, \=10, and —11. In a code wherein eight distinct glyphs are possible, each symbol can represent three bits, and the like. Data can be encoded in the shape of the glyphs, the rotation of the glyphs, or in any other desired variation, In embodiments, the glyphs are elliptical marks, and in a simple code wherein two distinct shapes are possible, the glyphs preferably are elliptical marks rotated from the vertical at either about +45° (for example, "/") or −45° (for example "\"). The use of orthogonally-oriented marks potentially allows for a large degree of discrimination between data bit 1 and data bit 0. The marks may be inclined at about 45°, rather than being horizontal or vertical, because (a) there is less tendency for adjacent marks to touch, (b) the eye is less sensitive to diagonal lines than to vertical or horizontal lines, and (c) printing and scanning non-uniformities tend to be horizontal (banding) or vertical (photodetector array response variations). In an embodiment, the two glyphs may each be elongated multi-pixel symbols having the same number of adjacent "ON" pixels and differ from each other in their rotation from the vertical. These specific glyphs are readily discernible from each other, even in the presence of significant distortion and image degradation, because they do not tend to degrade into a common shape.

In embodiments, the different glyph markings not only have different orientations, but also different printed heights. By employing different heights for the glyph markings, an advantage is that the capacity for encrypting and storing information can be significantly increased, and that two different mechanisms for encryption are used. First is the glyph orientation (for example, left or right) discussed above. Second is the different printed heights of the glyphs, as described above. This provides for four different states that may be used as a mechanism of encrypting more information on the same surface of a substrate. With conventional same height glyphs, one uses only the first mechanism (glyph orientation), which provides only two states. The four states achievable when using printed glyphs of different heights to form the glyphs may be as follows: (1) oriented right/first height (binary code 00), (2) oriented right/different second height (binary code 01), (3) oriented left/first or second height, or a different third height (binary code 10), and (4) oriented left/second or first height, or a different fourth height (binary code 11). Thus, in embodiments, the machine readable code format comprises a set of four glyphs, wherein each glyph corresponds to a different digital value selected from the group consisting of 00, 01, 10 and 11, and wherein the four glyphs comprise one of two different orientations and one of four different heights. Stated another way, the machine readable code may be comprised of four different printed markings, wherein each of the printed markings is a glyph and each of the four symbols represents a different data value selected from the group consisting of 00, 01, 10 and 11, and wherein each of the four printed glyph markings is a different one of a first printed glyph that is elongated along an axis tilted at an angle of plus about 45° with respect to a horizontal axis and having a first predetermined print height, a second printed glyph that is elongated along an axis tilted at an angle of plus about 45° with respect to a horizontal axis and having a second predetermined print height different from the first predetermined height, a third printed glyph that is elongated along an axis tilted at an angle of minus about 45° with respect to a horizontal axis and having the first predetermined print height, the second predetermined print height or a third predetermined print height different from the first and the second predetermined print heights, and a fourth printed glyph that is elongated along an axis tilted at an angle of minus about 45° with respect to a horizontal axis and having a predetermined print height different from the third printed glyph.

The printed markings may have a very small width and/or diameter, for example limited only by the resolution of the image forming device. An average width or diameter of the printed markings may be from, for example, about 10 µm to about 1,000 µm, for example from about 10 µm to about 100 µm or from about 40 µm to about 100 µm.

The printed markings have an advantage in that as a result of the different print heights of the markings, even when the printed markings are formed using a marking material including a visible colorant therein, the encrypted code cannot be copied or reproduced by today's office equipment such as copiers and scanners. Moreover, persons attempting to counterfeit or copy the item having the encrypted code thereon typically will not be able to discern the height differential in the printed markings. As a result, photocopied items may replicate the viewable code pattern, but will lack the height differential so that the item can be readily detected as a fake.

In addition, the printed markings may be formed using substantially colorless/clear marking materials. This adds a still further security feature in that photocopies and scans of the image will not include the security markings at all, and a forger may not even know of the existence of the security markings in the image. The reading device, however, can still detect the security markings and discern the height differentials, so that the encrypted information can be recovered. In addition, the use of substantially colorless marking materials allows for the possibility that the security markings may be located over a regular printed image, since the substantially colorless marking material will not interfere with the desired regular image.

Moreover, use of the raised printed markings, which can be of a very small size as limited only by the resolution of the image forming device used, enables a grater amount of information to be printed in a smaller region. This is also beneficial with respect to recovering encrypted information in damaged documents. That is, in recovering information from damaged documents, there is a significantly higher proportion of the document that can be recovered when compared with current encryption technology, for example because the small size of the printed markings permit a larger amount of information to be stored via encryption. Thus, the amount of duplicate information (overprotection) written into the document can be increased compared with conventional glyphs.

The printed markings may be formed on any desired image receiving substrate. Common substrates include, for example, paper, cardboard, plastic and the like.

The printed markings may be formed by any suitable process that can form images on a substrate with a desired height. For example, the raised printed markings may be formed, for example using existing ink jet printing devices and the like with appropriate multiple passing. That is, knowing the print height of the particular marking material on a given substrate formed using the image forming device, the appropriate print heights for each of the printed markings may then be readily formed with the appropriate number of print passes to achieve the required print height for each of the printed markings.

As marking materials for forming the printed markings, any marking material that is capable of forming a particular height on a substrate may be used. In this regard, solid ink marking materials are suitable for paper substrates. It may be more difficult to use liquid ink marking materials on paper substrates, as such tend to absorb into the paper substrate rather than build height thereon. However, this is not to say that liquid ink marking materials cannot be used in certain applications and/or used when height building measures are taken, for example using gellants or UV curing to prevent substantially diffusion into the paper substrate.

The marking material may either be made to not contain any visible colorant so as to be a substantially colorless marking material, or it may include visible colorants.

In addition, the marking materials may optionally contain agents that cause a change in the appearance of the ink under different condition, for example such as fluorescent agents that fluoresce under UV light conditions or photochromic agents that change in appearance under different conditions. An advantage in using such agents is that the information can be made to be invisible in ambient light, and becomes visible only upon exposure to the different condition (light and,/or temperature) at which the change in appearance occurs. A still further advantage is that the appearance change offers yet another security measure that is not readily duplicated, for example through us of existing photocopiers and scanners. The marking materials may also include a wax and/or other conventional additives such as flow aids, charge additives, drying aids, and the like.

Any conventional marking materials, inclusive of inks and toners, may be used. Examples of suitable marking materials include inks, including lithographic and flexographic inks, aqueous inks, including those suitable for use with ink jet printing processes, liquid and dry toner materials suitable for use in electrostatic imaging processes, solid hot melt inks, including those suitable for use with ink jet printing processes, and the like. As indicated above, solid inks may provide particularly desirable control and results.

Such marking materials typically comprise at least a vehicle with a colorant such as pigment, dye, mixtures of pigments, mixtures of dyes, or mixtures of pigments and dyes, therein. The colorant may be present in a colored marking material in any desired amount, for example from about 0.5 to about 75% by weight of the marking material, for example from about 1 to about 50% or from about 1 to about 25%, by weight of the marking material.

As colorants, examples may include any dye or pigment capable of being dispersed or dissolved in the vehicle. Examples of suitable pigments include, for example, PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RE (Ciba); PALIOGEN Red 3871 K (BASF); SUNFAST® Blue 15:3 (Sun Chemical 249-1284); PALIOGEN Red 3340 (:BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL, (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL available from Clariant; and the like. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

As the marking material vehicle, any ink or toner vehicle may be suitably used. For phase chance solid inks, the vehicle may be any of those described in U.S. patent application Ser. No. 11/548,775, U.S. Pat. No. 6,906,118 and/or U.S. Pat. No. 5,122,187, each incorporated herein by reference in its entirety. The ink vehicle may also be radiation curable, for example any of the ink vehicles described in U.S. patent application Ser. No. 11/548,774, incorporated herein by reference in its entirety. The ink vehicle may also be any toner polymer binder, for example such as a polyester or a polyacrylate and the like.

The marking material vehicle may also include a wax such as paraffins, microcrystalline waxes, polyolefin waxes such as polyethylene or polypropylene waxes, ester waxes, fatty acids and other waxy materials, fatty amide containing materials, sulfonamide materials, resinous materials made from different natural sources (tall oil rosins and rosin esters, for example), and synthetic waxes. The wax may be present in an amount of from about 5% to about 60% by weight of the marking material. Examples of suitable waxes include polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. The commercially available polyethylenes selected usually possess a molecular weight of from about 1,000 to about 1,500 while the commercially available polypropylenes utilized for the toner compositions of the present invention are believed to have a molecular weight of from about 4,000 to about 5,000. Examples of suitable functionalized waxes include, for example, amines, amides, imides, esters, quaternary amines, carboxylic acids or acrylic polymer emulsion, for example JONCRYL™ 74, 89, 130, 537, and 538, all available from SC Johnson Wax, chlorinated polypropylenes and polyethylenes commercially available from Allied Chemical and Petrolite Corporation and SC Johnson wax.

The printed markings can be machine read and decoded by any suitable or desired method. The reading is based on the different print heights of the printed markings. For example, the digital information is read by an electronic reader which has the capability to distinguish between the different print heights. The reader may operate, for example, by absorption, transmission or reflection spectroscopy, since different heights of the printed markings will show different optical properties. In addition, a profilometer, capable of measuring actual print heights, could be used. For glyph printed markings, bitmap images of the glyphs can be processed even when image distortion or degradation has occurred by, for example, facsimile transmission, scanning of photocopies, or the like. In certain decoders, the image processing which is performed for decoding the glyph codes first locates the glyphs in the X-Y coordinates of the bitmap image space, then constructs a table for indexing the glyphs in the spatial order in which data was encoded in them, and then analyzes the glyphs in indexed order for sequentially extracting the data values encoded therein. In other decoders, the image processing classifies the glyphs by their shapes while concurrently locating their centers in the bitmap image space, so the decoded values of the glyphs conveniently are indexed to the bitmap image space. These spatially indexed decoded data values may be sorted in accordance with the spatial template or pattern that governs their spatial ordering if it is desired to restore their serial order in the time domain.

Once the printed markings are read and decoded or translated into the digital values, appropriate software may be used to convert the values to human readable information.

The system for embedding and recovering the information on a substrate comprises an image forming device for writing the printed markings. The image forming device receives data regarding the printed markings to be formed on the substrate, and forms the printed markings corresponding to the data. The system may also include a processor that converts the information to be encrypted into the appropriate digital values and/or into the data for forming the printed markings for use by the image forming device.

As the image forming device, an ink jet device, a xerographic device or other device for forming images with a marking material may be used. Suitable methods include, but are not limited to, electrostatic printing processes such as electrophotography and ionography, wherein an electrostatic latent image is formed and developed with the fluorescent marking material, either dry or liquid; ink jet printing processes, including both continuous stream processes and drop on demand processes (including piezoelectric, thermal or bubble jet, or the like), wherein droplets of an ink containing the fluorescent material are jetted in imagewise fashion onto the desired substrate; hot melt ink jet processes, wherein an ink containing the fluorescent material is solid at room temperature and liquid at elevated temperatures and wherein the ink is heated to a temperature above its melting point and jetted onto a substrate in an imagewise fashion; conventional printing processes, including lithographic and flexographic processes; and the like. In embodiments, the image forming device is an ink jet device, for example for jetting solid inks.

Printed markings may thus be generated with an ink jet device, for example a thermal ink jet device, an acoustic ink jet device, a piezoelectric ink jet device and the like, and concurrently causing droplets of molten ink to be ejected in an imagewise pattern forming the coded printed markings onto an image receiving substrate such as paper, cardboard, plastic, transparency material and the like. The ink is typically included in a reservoir connected by any suitable feeding device to the corresponding ejecting channels of an ink jet head. In the jetting procedure, the ink jet head may be heated, by any suitable method, to the jetting temperature of the ink.

In embodiments, the image forming device may also comprise both a xerographic device and an ink jet device. For example, the image forming device may include a xerographic device and a separate ink jet device containing the marking material for forming the printed markings. The xerographic device can be used to form a reproduced image, while the ink jet device can print the encrypted information onto each document. Desirably, the ink jet device is downstream of the xerographic device in a process direction, so that the encrypted information is not overprinted by the xerographic device, but the ink jet device may also be upstream of the xerographic device.

The system further includes a reading device or reader. As discussed above, the reader may use any available technology to detect the different print heights of the printed markings. Also as noted above, the system may further include a processor that converts the detected data into digital values and/or into human readable information.

It will be appreciated that various of the above-disclosed and other features and functions, or alternatives thereof, may be desirably combined into many other different systems or applications. Also that various presently unforeseen or unanticipated alternatives, modification, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. Machine readable code comprising a set of printed markings, wherein each printed marking of the set has a predetermined print height on a substrate and represents a predetermined data value, wherein the set of printed markings includes printed markings representing different data values and having different print heights, and wherein printed markings having a same predetermined height have a height that is within +/−1 μm of each other.

2. Machine readable code according to claim 1, wherein the code is a bar code.

3. Machine readable code according to claim 2, wherein the set of printed markings includes two to ten printed markings of different predetermined print heights.

4. Machine readable code according to claim 2, wherein the set includes ten different printed markings of different predetermined print heights, and wherein each of the ten different printed markings represents a different one of the data values selected from 0, 1, 2, 3, 4, 5, 6, 7, 8 and 9.

5. Machine readable code according to claim 4, wherein the different predetermined print heights for each of the different printed markings differ from each other by from about 3 μm to about 25 μm.

6. Machine readable code according to claim 1, wherein the code is binary code based.

7. Machine readable code according to claim 6, wherein the set of printed markings includes two printed markings of different predetermined print heights.

8. Machine readable code according to claim 7, wherein the different predetermined print heights for each of the two different printed markings differ from each other by from about 3 μm to about 25 μm.

9. Machine readable code according to claim 1, wherein the machine readable code is comprised of four different printed markings, wherein each of the printed markings is a glyph and each of the four symbols represents a different data value selected from the group consisting of 00, 01, 10 and 11, and wherein each of the four printed glyph markings is a different one of:

a first printed glyph that is elongated along an axis tilted at an angle of plus about 45° with respect to a horizontal axis and having a first predetermined print height;

a second printed glyph that is elongated along an axis tilted at an angle of plus about 45° with respect to a horizontal axis and having a second predetermined print height different from the first predetermined height;

a third printed glyph that is elongated along an axis tilted at an angle of minus about 45° with respect to a horizontal axis and having the first predetermined print height, the second predetermined print height or a third predetermined print height different from the first and the second predetermined print heights; and a fourth printed glyph that is elongated along an axis tilted at an angle of minus about 45° with respect to a horizontal axis and having a predetermined print height different from the third printed glyph.

10. Machine readable code comprising a set of printed markings, wherein each printed marking of the set has a predetermined print height on a substrate and represents a predetermined data value, wherein the set of printed markings includes printed markings representing different data values and having different print heights, and wherein the printed markings have an average width or diameter of from about 10 µm to about 1,000 µm.

11. A substrate having machine readable code thereon, wherein the code comprises a set of printed markings, wherein each printed marking of the set has a predetermined height on a substrate and represents a predetermined data value, wherein printed markings having a same predetermined height represent a same data value, and wherein printed markings representing different data values have different heights and wherein the different heights representing different data values differ from each other by from about 3 µm to about 25 µm.

12. The substrate according to claim 11, wherein the substrate comprises paper, cardboard or plastic.

13. The substrate according to claim 11, wherein the printed markings are formed from substantially colorless ink or toner.

14. A method of embedding information on a substrate, comprising:
converting the information to machine readable code, wherein the code comprises a set of intended printed markings, wherein each intended printed marking of the set has a predetermined height on a substrate and represents a predetermined data value, wherein intended printed markings having a same predetermined height represent a same data value, and wherein intended printed markings representing different data values have different heights and wherein the different heights differ from each other by from about 3 µm to about 25 µm; and
writing the machine readable code on the substrate such that each of the intended printed markings is formed as a printed marking with the predetermined height.

15. The method according to claim 14, wherein printed markings having a same predetermined height have a height that is within +/−1 µm of each other.

16. The method according to claim 14, wherein the printed markings are written with a substantially colorless marking material.

* * * * *